Patented Jan. 19, 1932

1,841,441

UNITED STATES PATENT OFFICE

RICHARD HERZ, OF FRANKFORT-ON-THE-MAIN, AND WALTER BRUNNER, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

4'-METHYL-6-HALOGEN THIOINDIGOS AND THEIR 6'-HALOGEN DERIVATIVES

No Drawing. Application filed August 24, 1929, Serial No. 388,256, and in Germany September 6, 1928.

Our present invention relates to new vat dyestuffs of the thioindigo series which are obtainable by condensing together two compounds corresponding to the general formulae:

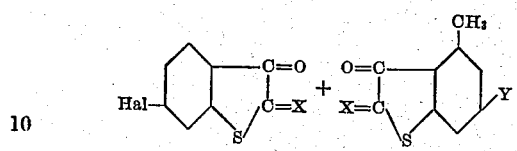

wherein one X means $H_2$, the other X an anil group and Y means hydrogen or halogen.

The dyestuffs thus obtainable correspond to the general formula

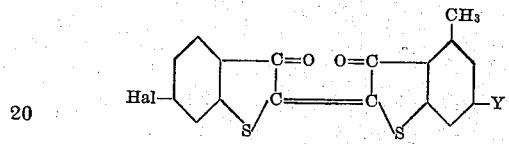

wherein Y means hydrogen or halogen.

They dye cotton from a hydrosulfite vat pink to red shades of nearly the same brightness as the 4.4'-dialkyl-6.6'-dihalogen-thioindigo dyestuffs. But they surpass the said dyestuffs by their fastness to light and exposure, which fact is of great technical importance.

In order to further illustrate our invention the following examples are given, the parts being by weight and all temperatures in centigrade degrees. But we wish it to be understood that we are not limited to the particular conditions nor specific products mentioned therein.

Example 1

184.4 parts of 6-chloro-3-hydroxy-thionaphthene are dissolved in about 4,000 parts of glacial acetic acid. To this solution 364 parts of 4-methyl-6-chloro-2.3-dihydro-3-keto-thionaphthene-2-(para-dimethylamino-anil), obtainable for instance by acting with para nitroso-dimethylaniline on an alkaline solution of 3-hydroxy-4-methyl-6-chloro-thionaphthene, are added. The mass is heated for some time until the formation of the dyestuff is finished. The precipitated dyestuff is filtered off. It corresponds to the formula

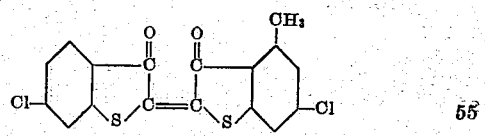

It represents when dry a dark red powder soluble in concentrated sulfuric acid to a green solution, dyeing cotton from a yellow vat bright bluish pink shades.

Example 2

3-hydroxy-4-methyl-6-chloro-thionaphthene is condensed with 6-choro-2.3-dihydro-3-keto-thionaphthene-2-anil in the manner described in Example 1. The dyestuff thus obtained is identical to that of Example 1.

Example 3

6-bromo-3-hydroxy-thionaphthene is condensed with 4-methyl-6-bromo-2.3-dihydro-3-keto-thionaphthene-2-(para-dimethylamino-anil) in the manner described in Example 1. The dyestuff thus obtained corresponds to the formula

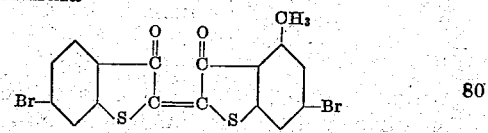

It shows similar properties as that of Example 1.

Example 4

When in Example 2 3-hydroxy-4-methyl-6-chloro-thionaphthene is replaced by 3-hydroxy-4-methyl-thionaphthene and the process is otherwise carried out in like manner, a new dyestuff is obtained which corresponds to the formula

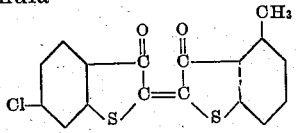

and dyes cotton bright bluish pink shades.

We claim:

1. As new compounds the vat dyestuffs of the general formula

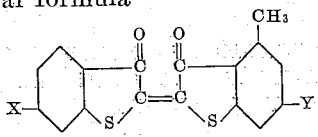

wherein X stands for a chlorine or bromine atom and Y represents hydrogen or a chlorine or bromine atom, which compounds are when dry dark red powders, soluble in concentrated sulfuric acid to greenish solutions, dyeing cotton from yellow vats bluish pink to red shades.

2. As a new compound the vat dyestuff of the formula

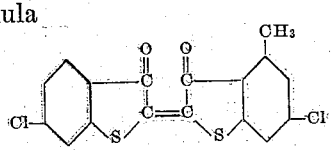

which compound is when dry a dark red powder, soluble in concentrated sulfuric acid to a green solution, dyeing cotton from a yellow vat bluish pink shades.

3. As a new compound the vat dyestuff of the formula:

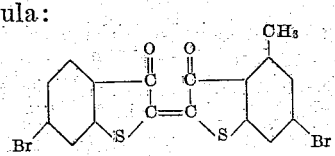

which compound is soluble in concentrated sulfuric acid to a greenish solution and dyes cotton from a yellow vat bluish pink shades.

4. As a new compound the vat dyestuff of the formula:

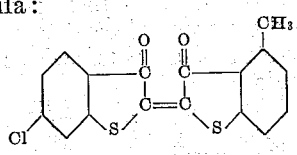

which compound is soluble in concentrated sulfuric acid to a greenish solution and dyes cotton from a yellow vat bright bluish pink shades.

In testimony whereof, we affix our signatures.

RICHARD HERZ.
WALTER BRUNNER.